(12) United States Patent
Ewers et al.

(10) Patent No.: US 6,820,990 B2
(45) Date of Patent: Nov. 23, 2004

(54) VEHICLE INSTRUMENT

(75) Inventors: Paul Simon Ewers, Chelmsford (GB); Maryline Thorailler, Barkingside (GB); Pascal Guirauton, Montigny les Cormeilles (FR)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/318,951

(22) Filed: Dec. 12, 2002

(65) Prior Publication Data

US 2003/0112619 A1 Jun. 19, 2003

(30) Foreign Application Priority Data

Dec. 14, 2001 (EP) .............................. 01310492

(51) Int. Cl.⁷ ................................................ G01D 11/28
(52) U.S. Cl. ............................ 362/27; 362/28; 362/489
(58) Field of Search .......................... 362/489, 27, 29, 362/30, 31, 28; 73/293; 116/250

(56) References Cited

U.S. PATENT DOCUMENTS 2,712,593 A    7/1955  Merchant
5,984,485 A  * 11/1999  Poli et al. ...................... 362/26
6,247,826 B1 *  6/2001  Funamoto et al. ............ 362/31
6,499,852 B1 * 12/2002  Kino et al. .................... 362/23
6,600,427 B2 *  7/2003  Simon et al. ........... 340/815.49

FOREIGN PATENT DOCUMENTS

DE    195 20 460 A1     4/1996
FR     2 760 414 A1    11/1998
JP        59-176690  * 10/1984  ........... G04C/10/02

* cited by examiner

Primary Examiner—Alan Cariaso
Assistant Examiner—Guiyoung Lee
(74) Attorney, Agent, or Firm—Brinks Hofer Gilson & Lione (57) ABSTRACT

The present invention relates to illumination of an instrument for displaying information. In particular the invention relates to illumination for an instrument suitable for use in a vehicle. Such instruments, located on the dashboard of an automotive vehicle, require illumination to allow the driver to read the information when it is dark. An instrument suitable for use in a vehicle is thus provided, generally comprising a housing, an information bearing surface, a transparent protective cover having an interior surface and an exterior surface, and a first light source coupled to the protective cover. The protective cover acts as a light guide and is arranged to allow light to escape at a selected location into the interior of the instrument to illuminate a portion of the information bearing surface.

22 Claims, 11 Drawing Sheets

VEHICLE INSTRUMENT

BACKGROUND OF THE INVENTION

The present invention relates to illumination of an instrument for displaying information. In particular the invention relates to illumination for an instrument suitable for use in a vehicle.

Such instruments include clocks, hand held computer games, mobile phones, in fact any instrument which is capable of displaying information electronically. Instruments for displaying information on a vehicle display are usually located on the dashboard of an automotive vehicle, and require some form of illumination to allow the driver to read the information when it is dark. An instrument usually comprises an information bearing surface in a housing having a transparent cover for protection of the instrument. The information bearing surface usually has symbols indicating a scale such as graphics, numbers or a dial, and a pointer for indicating a point within the scale, or may comprise a liquid crystal display suitable for displaying numeric information. The information bearing surface may also include features such as rings defining the perimeter of a particular instrument or gauge. The instrument is generally mounted on a printed circuit board (PCB) which is connected to sensors (directly or indirectly via a network) which monitor certain engine conditions such as speed, temperature and fuel level to name but a few. Conventionally instruments are mounted together to form an instrument cluster. As customers become more sophisticated in their requirements, it becomes important to provide lighting for vehicle instruments which is both distinctive, and cost effective to produce.

In general one of two types of illumination are used, either front lighting or back lighting. Front lighting refers to illumination from the viewing side of the information bearing surface which reflects off the information bearing surface. The light need not be perpendicular to the information bearing surface, hence this term includes side lighting, where the light is reflected from the information bearing surface. The information is printed so that the light reflecting from the symbols is in contrast to the light reflecting from a background, for example the symbols may be black and the background may be white or the symbols may be white and the background may be black. When the symbols are lighter than the background the illumination is known as negative mode, and when the symbols are darker than the background the instrument is described as positive mode.

Back lighting refers to illumination of the information bearing surface from the side opposite to the viewing side of the instrument. In this case the information surface contains opaque or semi opaque portions so that the light passing through the information bearing surface renders the symbols visible.

Backlighting of vehicle instrument panels has become more common as it is currently considered to provide a better overall appearance for the vehicle instrument panel because it is not required to mount lighting components in front of the instrument. However, front lighting provides a more pleasing appearance of the instrument when illuminated.

Front or back lighting may be achieved either by providing illumination directly from a light source (which may include the use of reflective surfaces), or indirectly from a light source which is coupled to a light guide which directs the light from the light source to the required illumination point.

A problem with known instruments which have an associated light source is that, while front lighting allows a simpler design for the information bearing surface and any associated pointers any cost savings resulting from these simplified designs are negated by the extra costs required for flexible connectors from the PCB to the light source or complex light guides, and for more complex assembly. Front lighting from a point source also often produces shadows. Back lighting on the other hand usually involves the use of a plurality of light sources, and a more complex arrangement is required to illuminate the pointer. Furthermore, applying symbols to the information bearing surface is more complex in the back lighting case because poor distribution of the illumination can cause portions of the instrument to have better illumination than others. This is compensated for by providing different thickness of opaque or semi opaque portions in some areas than in others A further problem with backlighting is that as light sources, in particular light emitting diodes (LEDs) develop and more light emission becomes possible, distribution of that light in an effective manner becomes more difficult.

BRIEF SUMMARY OF THE INVENTION

According to the invention there is provided an illumination system suitable for illuminating an instrument, comprising an information bearing surface; a substantially transparent protective cover; and a first light source coupled to the protective cover such that the protective cover acts as a light guide; wherein the protective cover is arranged to allow light to escape at a selected location to illuminate a portion of the information bearing surface.

The illumination system of the invention is particularly suitable for illumination of vehicle instruments. According to another aspect of the invention there is also provided an instrument suitable for use in a vehicle, comprising an information bearing surface; a substantially transparent protective cover having an interior surface and an exterior surface; and a first light source coupled to the protective cover such that the protective cover acts as a light guide; wherein the protective cover is arranged to allow light to escape at a selected location into the interior of the instrument to illuminate a portion of the information bearing surface.

The information bearing surface may be front lit by reflection of escaped light. Alternatively a surface of the protective cover may comprise the information bearing surface, the information bearing surface may be back lit by reflection of escaped light from an interior surface.

The instrument may be lit using two or more light sources of different colors, and the colors may be combined to provide different controlled variations in color. Therefore in one embodiment the instrument has a plurality of light sources, and in which each light source produces light of a different color from the light produced by each other of light sources.

It is possible to provide a flexible illumination system in which different options are used in different vehicle models, therefore in another embodiment of the invention, the instrument further comprises a second light source, arranged to backlight the information bearing surface, such that the information bearing surface may be illuminated by the first light source, by the second light source or the first light source and the second light source simultaneously.

Advantageously the protective cover has a focussing element on the interior surface to focus escaped light. Furthermore it may also have a chamfered edge around the perimeter of the protective cover.

A pleasing appearance may be achieved by allowing light to escape from the exterior of the instrument, for example, to provide a feature light around the perimeter of the instrument. Accordingly in one embodiment light is arranged to escape from the protective cover to the exterior of the instrument at a selected location.

The invention allows an instrument cluster to be used in which the information bearing surfaces are not coplanar. A problem with instrument clusters in which the information bearing surfaces are not coplanar is that illumination is difficult to achieve without the information surface closest to a light source causing shadowing for an information surface which are further from the light source. Accordingly, in another aspect the invention also provides instrument cluster comprising a plurality of instruments using the illumination system described above arranged such that the information bearing surfaces of a first instrument is other than coplanar with the information bearing surface of a second instrument.

BRIEF DESCRIPTION OF THE DRAWINGS

Embodiments of the invention will now be described, by way of example only, with reference to the accompanying drawings in which.

DETAILED DESCRIPTION OF THE INVENTION

Figure 1:
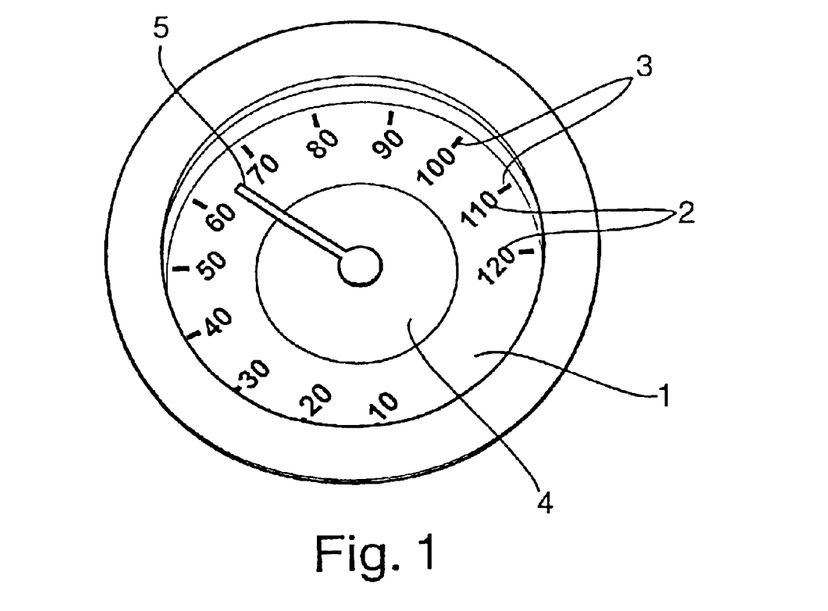
FIG. 1 is a front view of a vehicle instrument of one embodiment of the invention.

Referring now to FIG. 1, a vehicle instrument, according to one embodiment of the invention, comprises an information bearing surface 1 which has printed numerals 2, scale markers 3 and a central circle 4 (for styling). A pointer 5 indicates a position on a marked scale provided by the scale markers, according to signals received from relevant sensors (not shown). In this example the background of the information bearing surface is lighter than the printed numbers, thus the instrument is known as a positive mode instrument.

Figure 2:
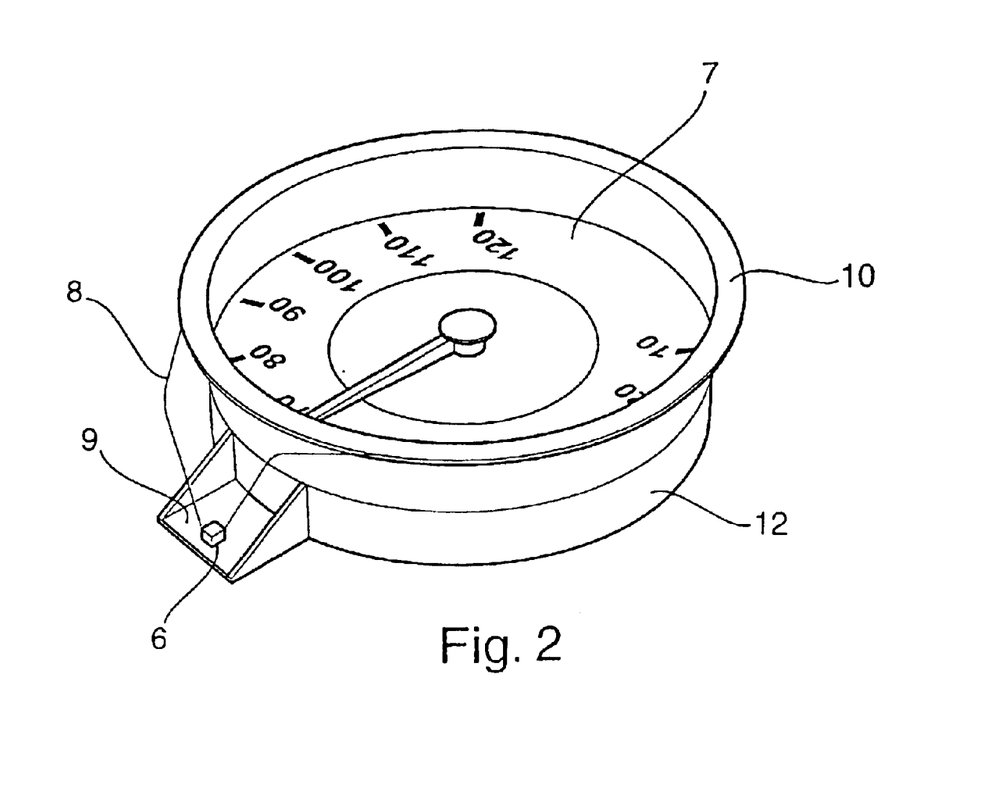
FIG. 2 is a perspective view of the instrument of FIG. 1.

FIG. 2 illustrates a perspective view of the vehicle instrument of FIG. 1. The instrument is mounted in a housing 12, which is mounted on a PCB 9. A light source 6 is coupled to a substantially transparent protective cover 7 by a light pickup 8. The protective cover has an interior (or proximal) surface which is adjacent the information bearing surface and an exterior (or distil) surface. The protective cover 7 may be fabricated from glass, acrylic, polycarbonate, or any suitable sufficiently transparent material which is capable of functioning as a light guide. The light pickup in this embodiment of the invention is an extension of the protective cover 7, which has been curved to allow the protective cover to be coupled to the light source 6, which is conveniently mounted on the PCB 9. The light pickup could be formed using any type of light guide, and could include a reflecting facet rather than guiding the light through an angle.

Around the rim of the protective cover 7 a ring 10 of white paint has been applied to the external surface of the protective cover 7. The white paint causes light which would otherwise be reflected back into the protective cover 7, due to the fact that the refractive index of air is less than that of the protective cover 7, to escape from the protective cover 7, due to the fact that the refractive index of the ring 10 of white paint is greater than that of the protective cover 7. Other techniques may be used to cause the light to escape from a selected location, for example hotfoil, which is a thin layer of plastic applied to the protective cover 7 by a stamping tool, or texture which may be applied to either surface of the protective cover may be used to facilitate dispersion of the light.

Figure 3:
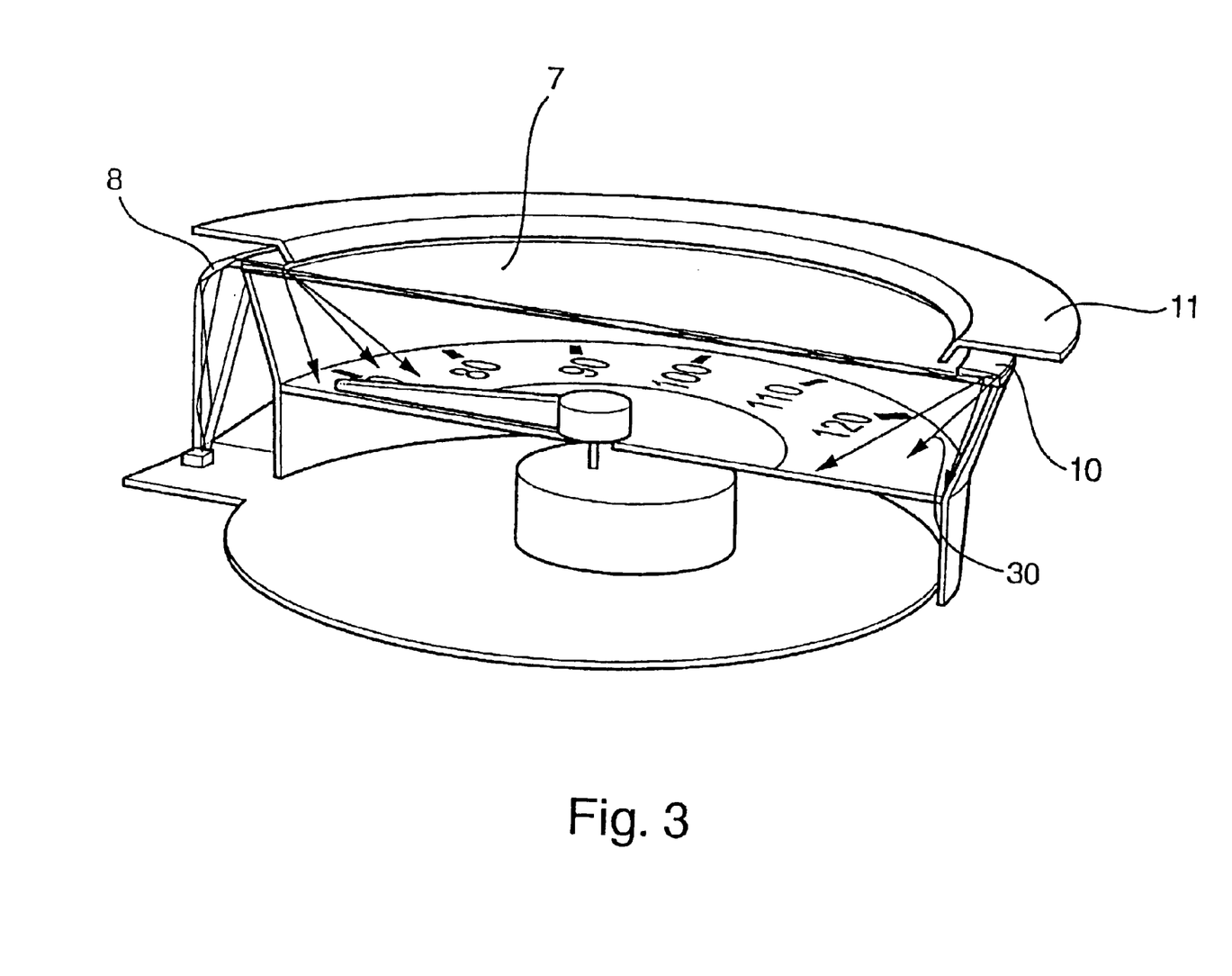
FIG. 3 is a partial cross section through the instrument of FIG. 2.

FIG. 3 shows a partial cross section through the instrument of FIG. 2, which illustrates light 30 escaping from a light guide formed by the light pickup 8 and the protective cover 7. Also shown in this view is a bezel 11, which serves to mask from view the area where light escapes.

The information bearing surface 1 and the pointer 5 are therefore front lit by illuminating the information bearing surface 1 by reflection of escaped light from an area defined by a ring 10 around the perimeter of the protective cover 7.

Figure 4:
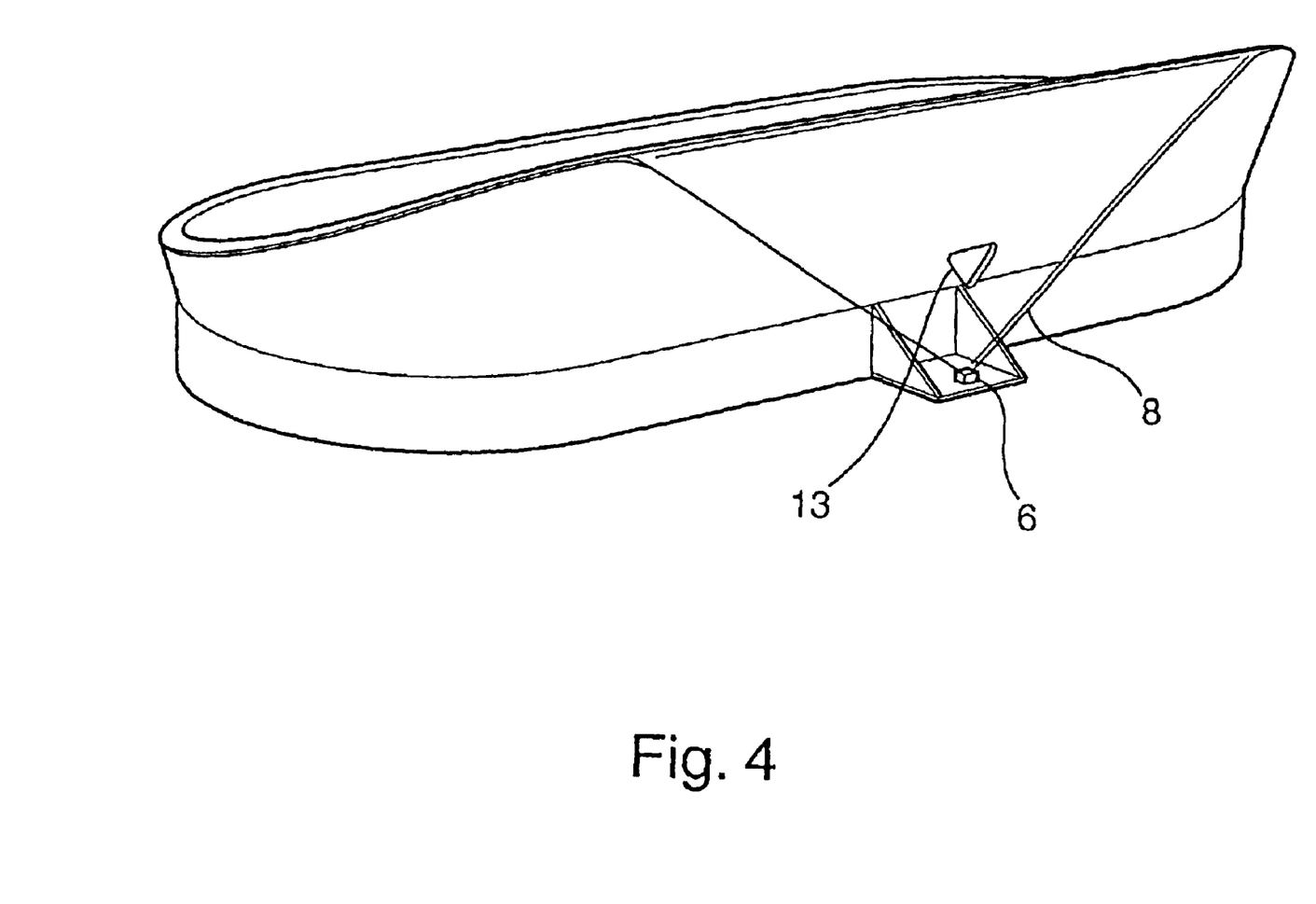
FIG. 4 illustrates an optical element for dispersion of light in a light pickup.

FIG. 4 illustrates a modification which may be made to the instrument illustrated in FIGS. 1 to 3, in which an element 13 within the light pickup 8 serves to disperse light from the light source 6 to direct less light across the center of the protective cover 7, and more around the perimeter of the protective cover 7.

Figure 5:
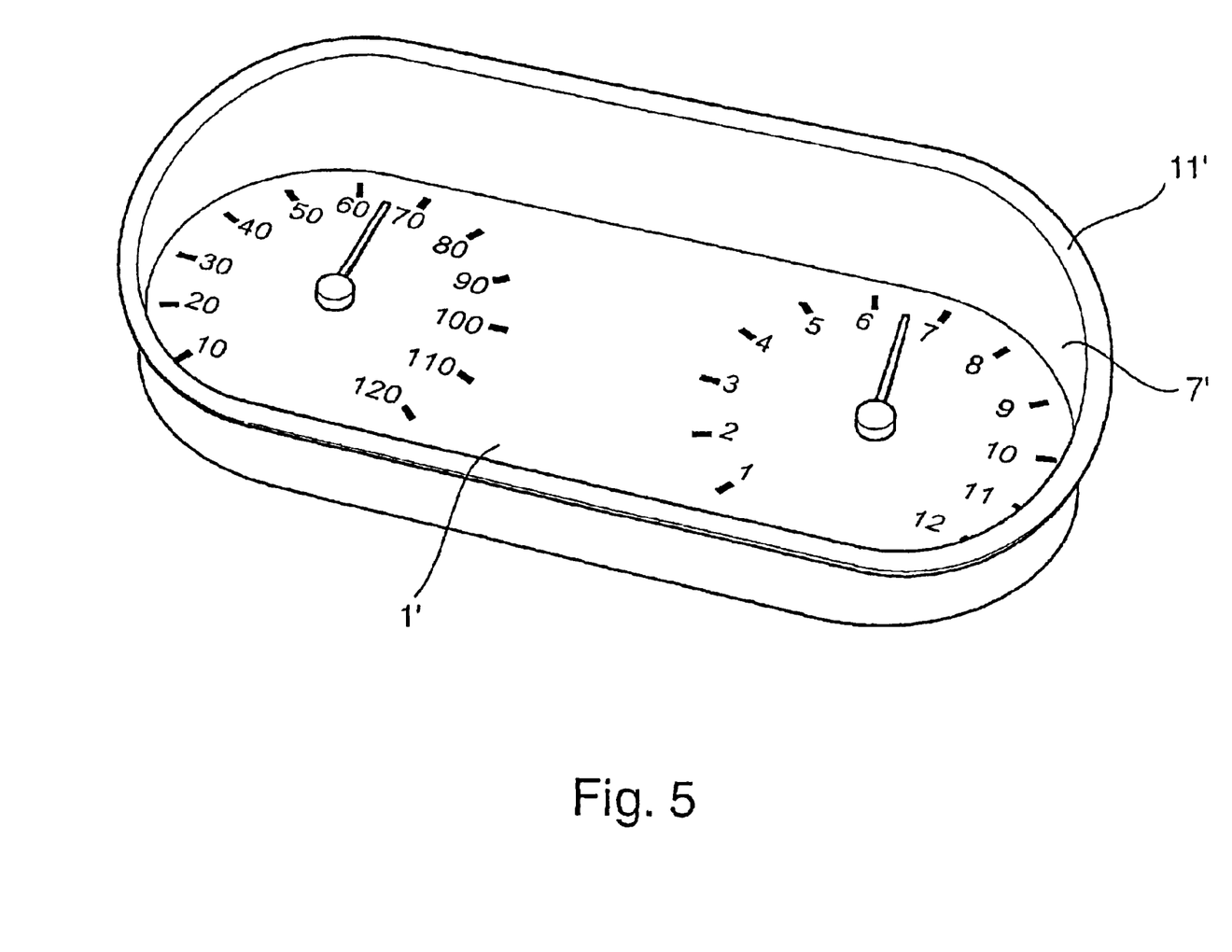
FIG. 5 illustrates a feature light around the perimeter of an instrument.
Figure 6:
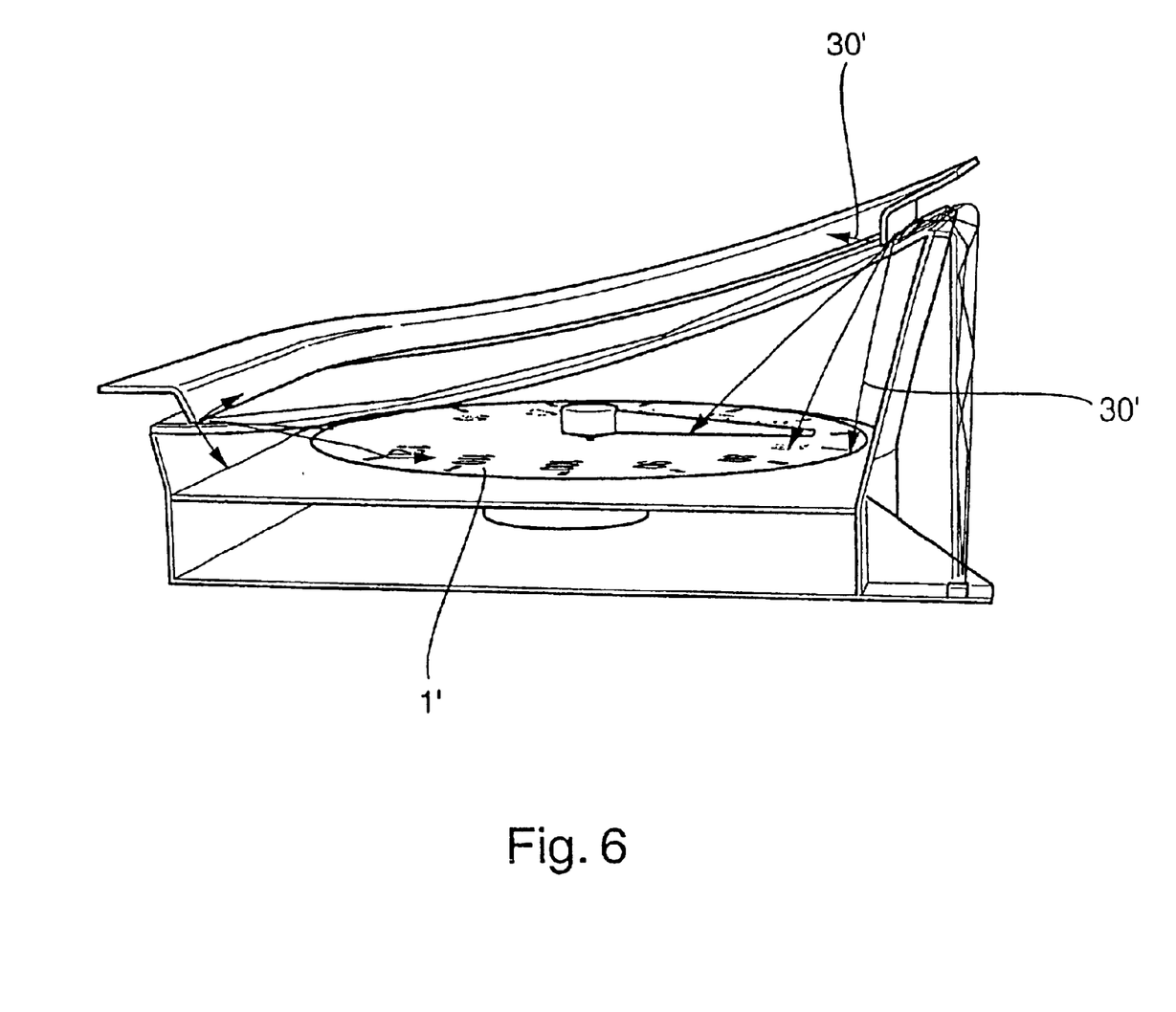
FIG. 6 is a cross section through the instrument of FIG. 5.

FIG. 5 illustrates an instrument cluster having two instruments on a single information bearing surface 1'. In this embodiment, which has a bezel 11' masking an area where light escapes. The bezel 11' is formed using a layer of black paint and overlies a white ring which could be provided in a single operation with a composite white and black layer. The protective cover 7' is also arranged to allow light to escape outwardly from the instrument, in order to provide a feature light around the perimeter of the instrument. FIG. 6 is a cross section through the instrument of FIG. 5, illustrating light 30' escaping into the interior of the instrument in order to illuminate the information bearing surface 1' by reflection of the escaped light, together with light escaping to the exterior of the instrument.

Figure 7:
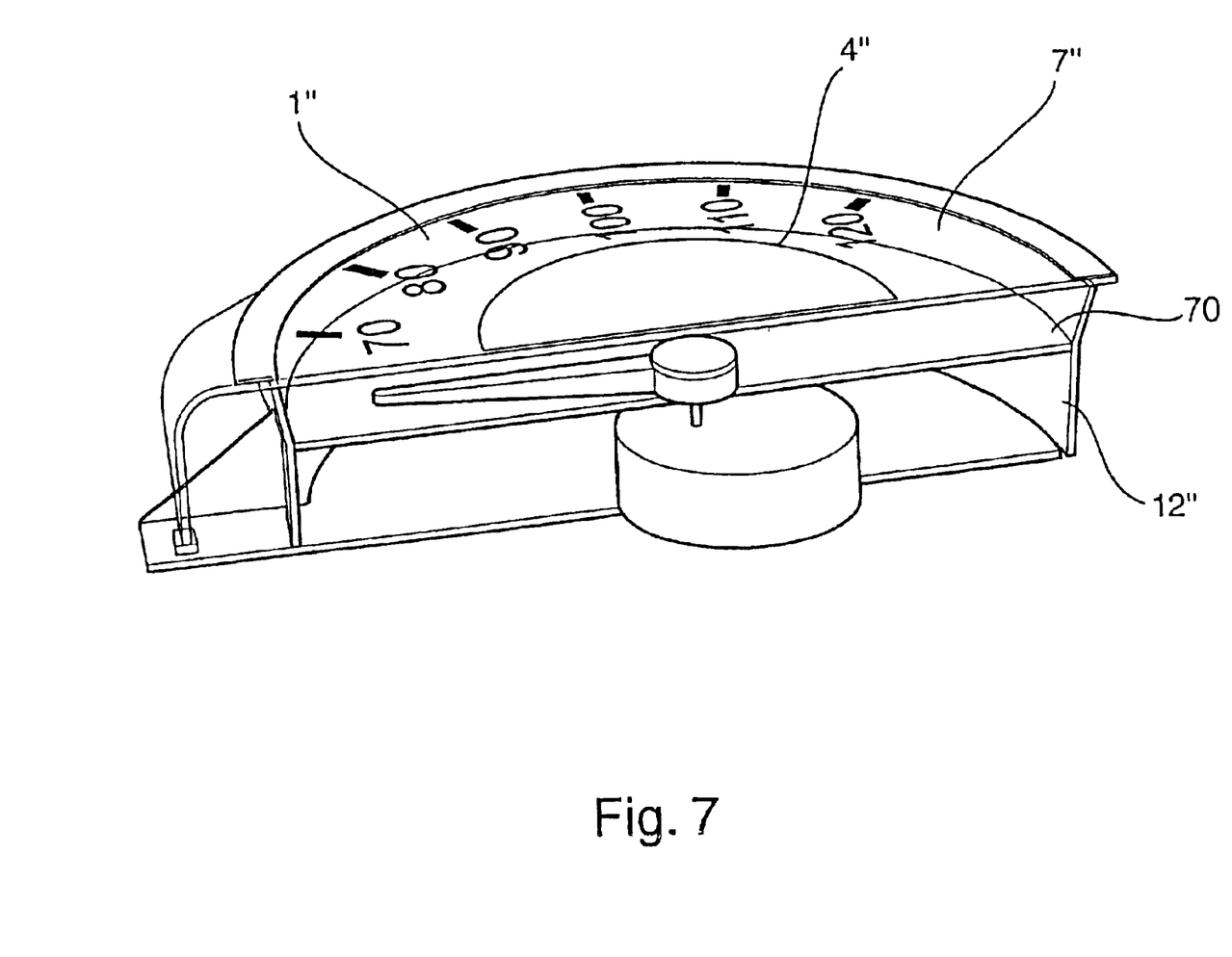
FIG. 7 illustrates another embodiment of the invention.

FIG. 7 illustrates a further embodiment of the invention, in which a the exterior surface of a protective cover 7" comprises the information bearing surface 1". In this case, the information bearing surface 1" is back lit by illumination due to reflection of escaped light from an interior surface of a housing 12". Either the interior or the exterior surface of the protective cover 7" may be used as the information bearing surface 1". However, if the interior surface is used then the symbols should be applied using a cladding layer having a lower refractive index than that of the protective cover, to avoid light escaping to the exterior of the instrument and lighting up the symbols.

A pointer is front lit by reflection of escaped light as in the previously described embodiments.

Figure 8:
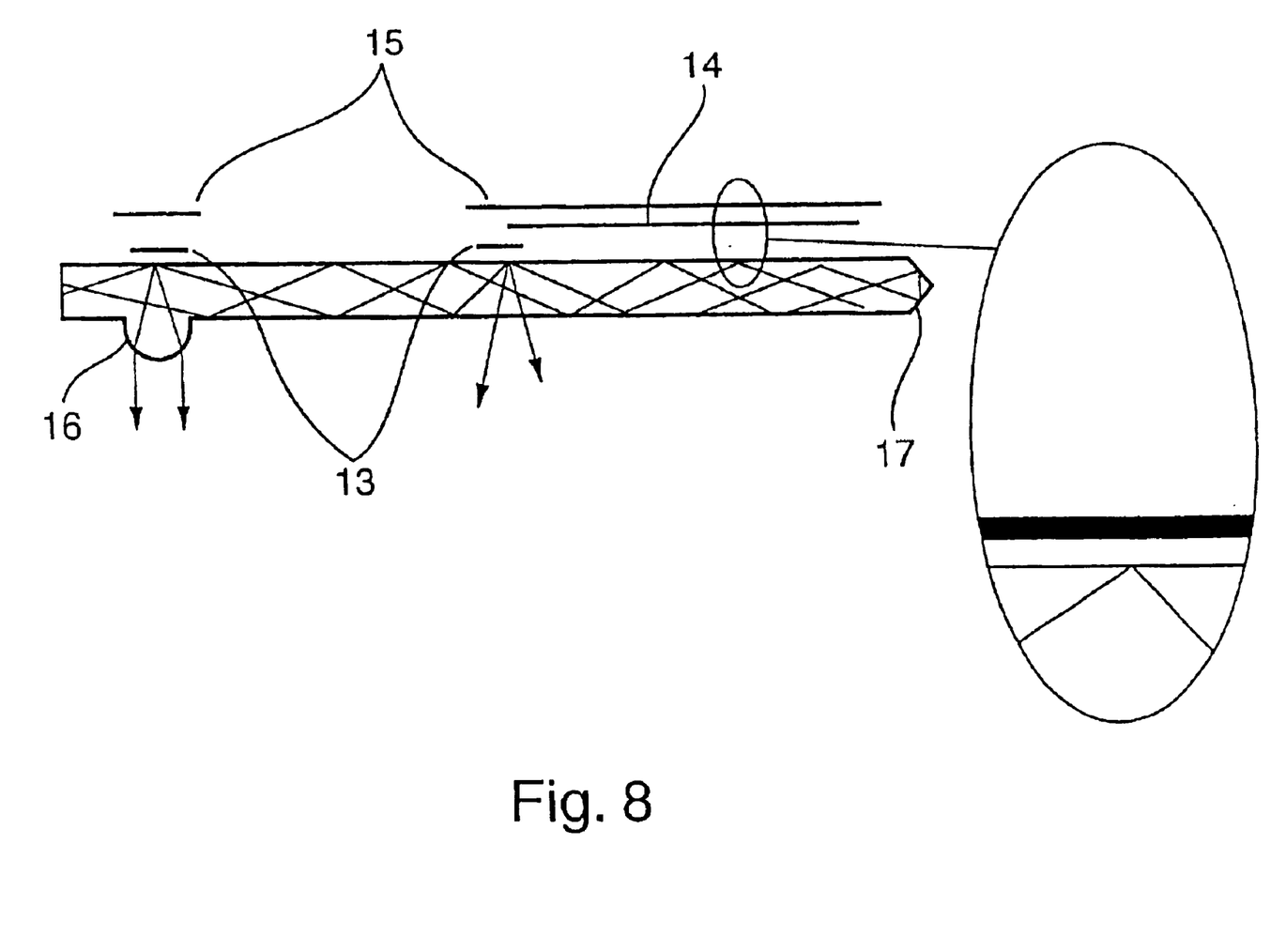
FIG. 8 is a cross section of a protective cover of the instrument shown in FIG. 7.

In FIG. 7 there is also shown a circle 4" marked onto the protective cover to achieve a pleasing appearance. A problem may arise, that the applied marking (including the information which is marked onto the protective cover) may cause the light to escape at undesirable locations, due to the fact that the refractive index of the marking material is greater that that of the protective cover. FIG. 8 illustrates a cross section of the protective cover 7" of FIG. 7 In this embodiment there is a white layer 13 applied to locations where it is required for light to escape. A cladding layer 14 is then applied to areas where it is undesirable for light to escape, and to which is intended to apply another layer, either for information or for styling purposes. Finally the decorative layer 15 is applied.

FIG. 8 also illustrates use of an optical element 16 which may be used in some embodiments of the invention to focus escaped light. An angled facet 17 at the edge of the protective cover 7" serves to reflect light back into the protective cover, rather than allowing it to escape.

Figure 9:
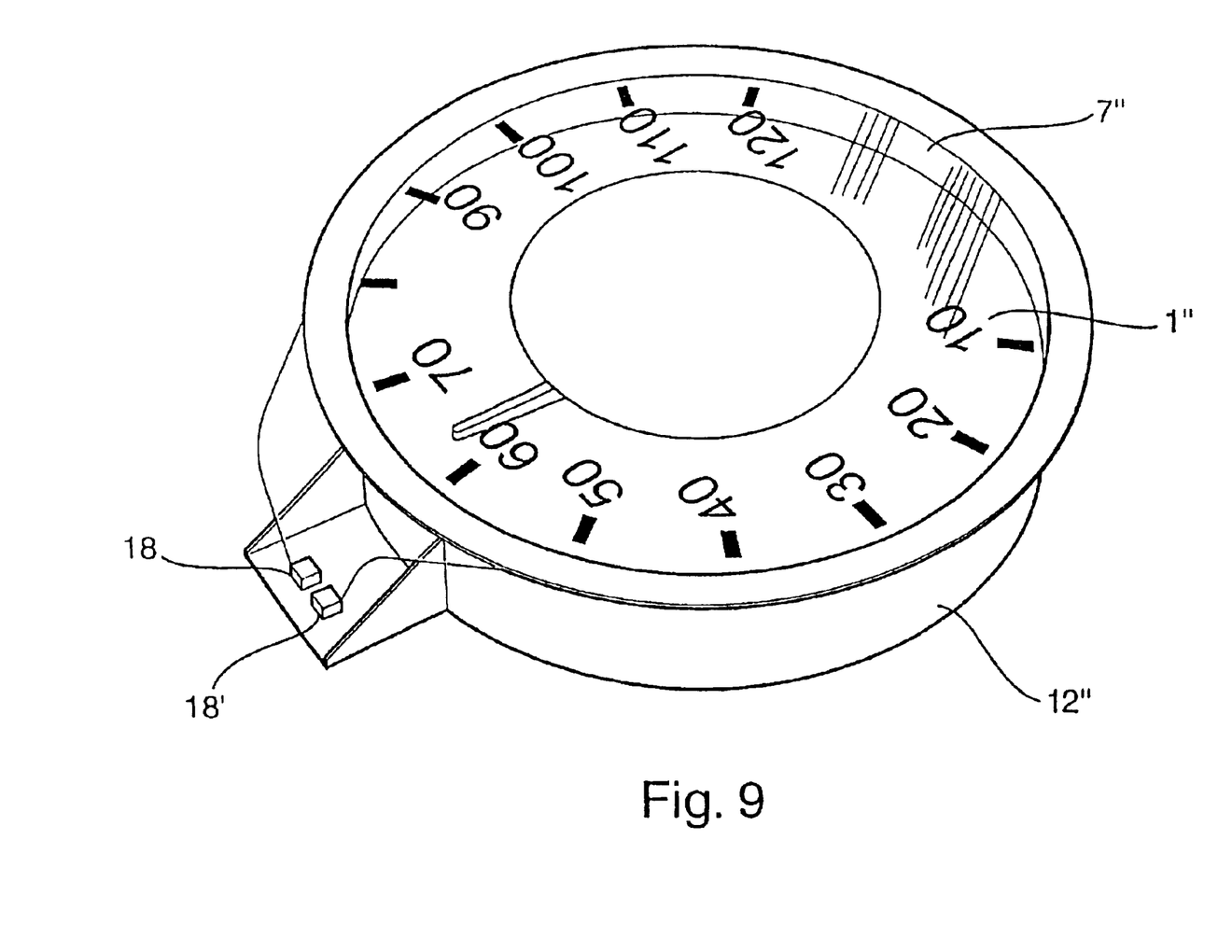
FIG. 9 illustrates an embodiment of the invention having two light sources.

FIG. 9 illustrates a modification, which may be applied to any of the previously described embodiments. In the illustrated example the modification has been made to the embodiment illustrated in FIGS. 7 and 8. Two light sources 18 and 18' are used to provide light of different colors, which may be used independently or may be mixed to provide a combined color light source.

An instrument according to the invention may be used in conjunction with illumination using backlighting. If for example the light source coupled to the protective cover produced blue light, and light source providing backlighting produced red light, then assuming positive mode graphics, three effects are possible:

a) illumination using escaped light from the protective cover, producing dark symbols on a blue background;
b) illumination using conventional backlighting, producing red symbols corresponding to the information;
c) illumination using a combination, producing red symbols on a blue background.

It is an advantage for component manufacturers if the three options described above can be provided using similar components such that different options are made available on different caliber vehicles. For example low caliber vehicles could be supplied with option a) mid caliber vehicle could be supplied with option b) and high caliber vehicle with option c).

Figure 10A:
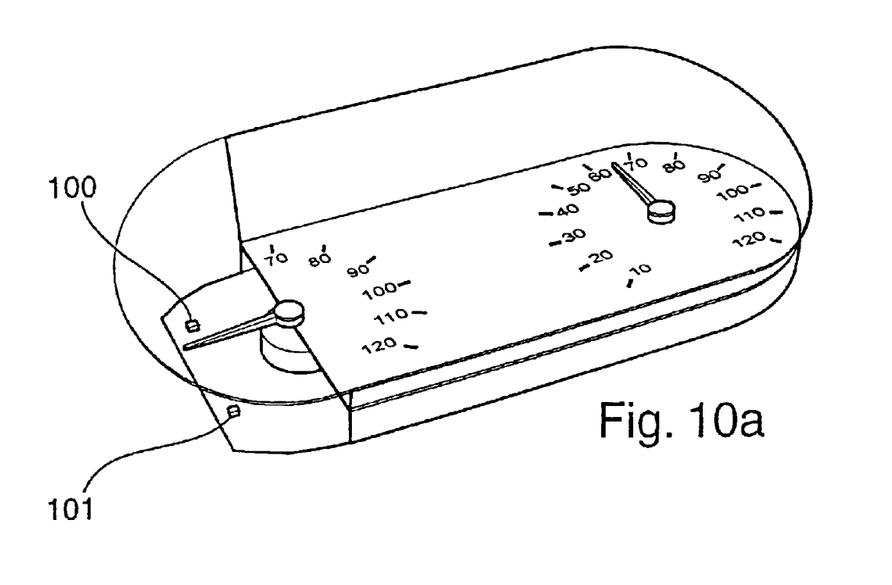
FIGS. 10a and 10b illustrate a PCB size reduction which may be achieved when an instrument according to the invention is used.
Figure 10B:
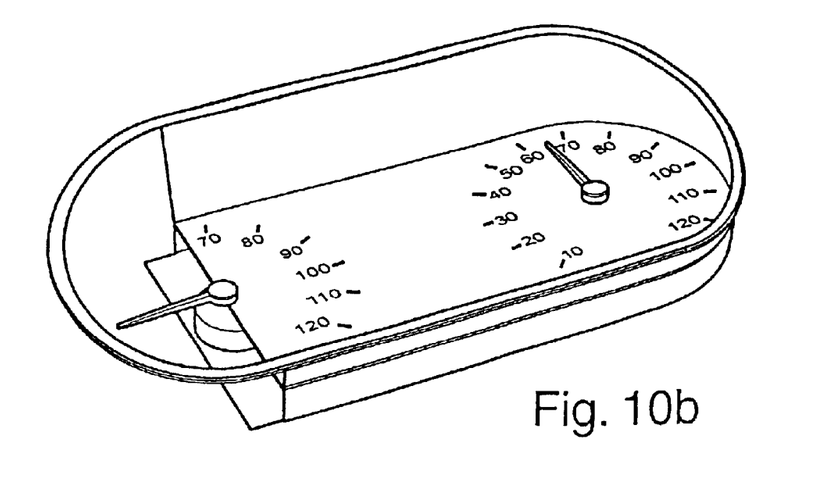

Another advantage of the invention is that the size of the PCB upon which the instruments are mounted may be reduced compared to PCBs supporting light sources using conventional backlighting. PCB costs are directly related to PCB size, and therefore it is desirable to reduce the size of the mounting PCB. FIGS. 10a and 10b illustrate a PCB size reduction which may be achieved when an instrument according to the invention is used. In FIG. 10a, the PCB supports LEDs 100 and 101 for illuminating an instrument from the back. In FIG. 10b, the PCB size is reduced because the illumination is provided via the protective cover, which extends over the whole of the information bearing surface.

Figure 11:
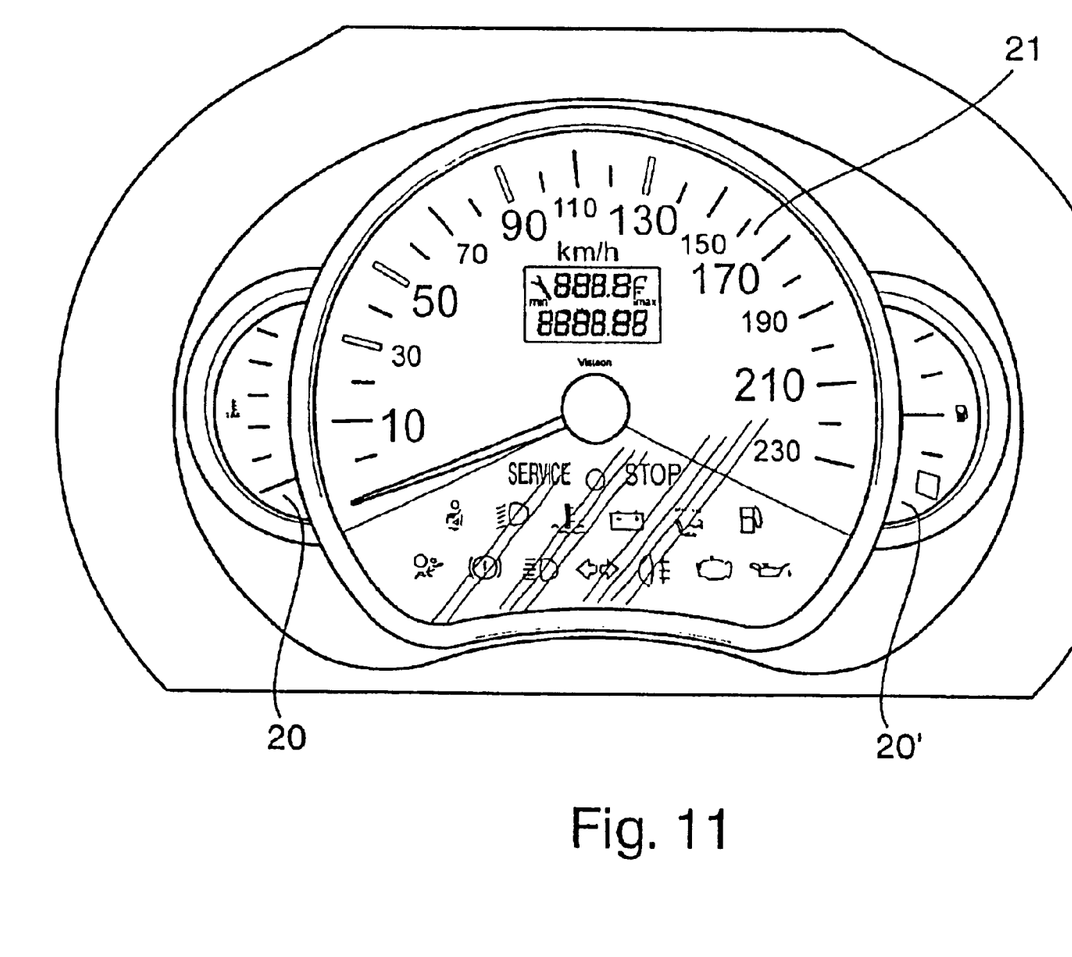
FIG. 11 illustrates an instrument cluster in which information bearing surfaces are other than coplanar.
Figure 12:
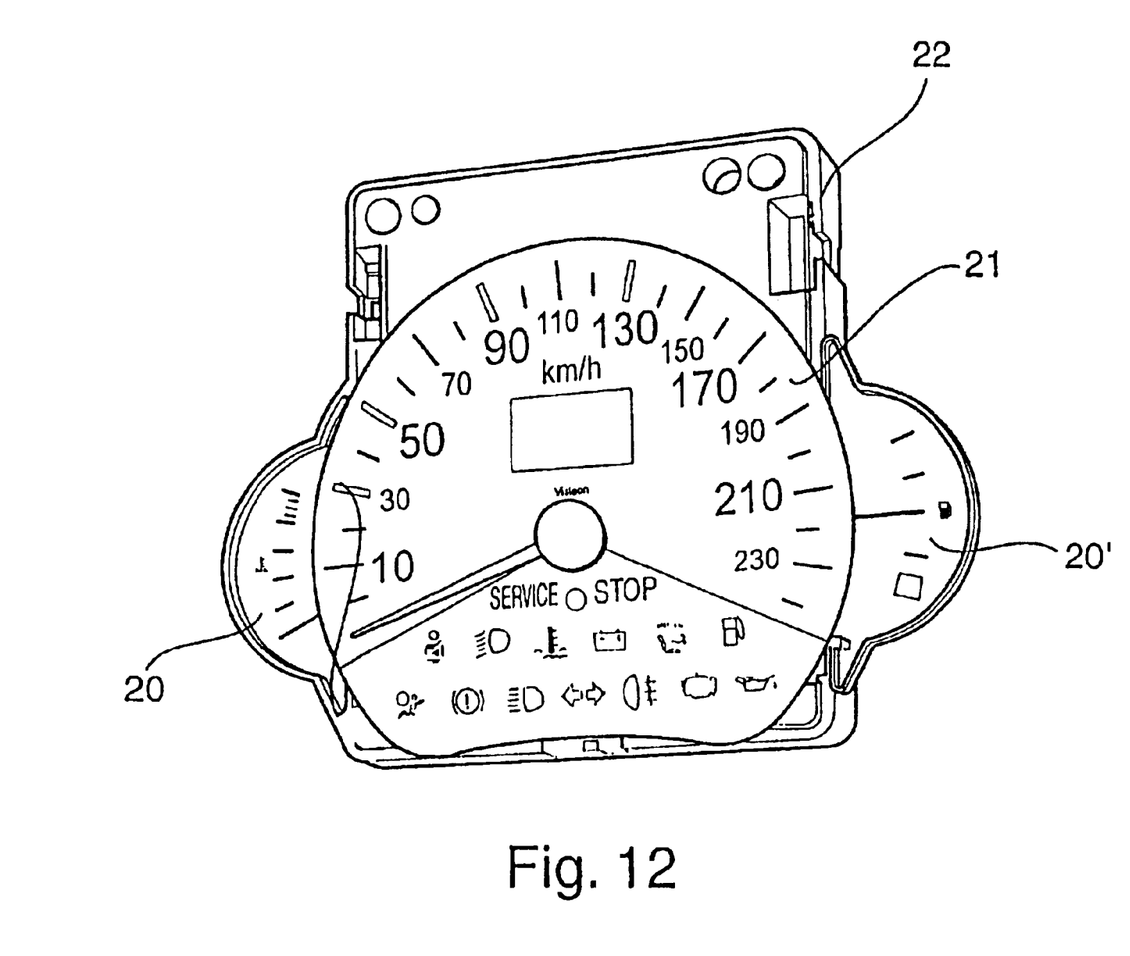
FIG. 12 shows the instrument cluster of FIG. 11 mounted on a PCB.

A further advantage of the invention is evident when an instrument cluster comprises several instruments for which do not have coplanar information bearing surfaces. In conventional front lit illumination systems, which typically have a point source of light, such clusters are extremely difficult to illuminate without introducing shadows. FIG. 11 shows such an instrument cluster in which the information bearing surfaces 20 and 20' are mounted rearwards of information bearing surface 21. Such an arrangement allows the size of a PCB 22 to be reduced, as illustrated in FIG. 12. A single protective cover is used, and since the illumination is provided from around the perimeter of the protective cover shadowing does not occur.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately, or in any suitable combination.

It is to be recognized that various alterations, modifications, and/or additions may be introduced into the constructions and arrangements of parts described above without departing from the spirit or ambit of the present invention.

What is claimed is:

1. An illumination system suitable for illuminating an instrument, comprising
   an information bearing surface;
   a substantially transparent protective cover;
   a first light source coupled to the protective cover such that the protective cover acts as a light guide; and
   a layer of material positioned on the protective cover at a selected location, the material having a refractive index greater than the refractive index of the protective cover to allow light to escape proximate the selected location to illuminate a portion of the information bearing surface.

2. An instrument suitable for use in a vehicle, comprising
   an information bearing surface;
   a substantially transparent protective cover having an interior surface and an exterior surface;
   a first light source coupled to the protective cover such that the protective cover acts as a light guide; and
   a layer of material positioned on the protective cover at a selected location, the material having a refractive index greater than the refractive index of the protective cover to allow light to escape proximate the selected location into the interior of the instrument to illuminate a portion of the information bearing surface.

3. An instrument according to claim 2, in which the information bearing surface is front lit by reflection of escaped light.

4. An instrument according to claim 2, in which a surface of the protective cover comprises the information bearing surface, and in which the information bearing surface is back lit by reflection of escaped light from an interior surface.

5. An instrument according to claim 4, further comprising a housing attached to the protective cover, the housing having an interior surface reflecting the light emitted from the protective cover.

6. An instrument according to claim 4, wherein the exterior surface of the protective cover forms the information bearing surface.

7. An instrument according to claim 4, wherein the interior surface of the protective cover forms the information bearing surface.

8. An instrument according to claim 7, further comprising a cladding layer positioned on the exterior surface of protective cover and proximate a marking of the information bearing surface, the cladding layer having a refractive index less than the refractive index of the protective cover to prevent light from escaping the protective cover proximate the cladding layer.

9. An instrument according to claim 2, comprising a plurality of light sources, and in which each light source produces light of a different color from the light produced by each other of light sources.

10. An instrument according to claim 2, further comprising a second light source, arranged to backlight the information bearing surface, such that the information bearing surface may be illuminated by the first light source, by the second light source or the first light source and the second light source simultaneously.

11. An instrument according to claim 2, in which the protective cover has a focusing element on the interior surface to focus escaped light.

12. An instrument according to claim 11, wherein the layer of material is positioned on the exterior surface of the protective cover and proximate the focusing element.

13. An instrument according to claim 11, wherein the focusing element is a projection having a curved surface forming a lens.

14. An instrument according to claim 2, in which the protective cover has a chamfered edge around the perimeter of the protective cover.

15. An instrument according to claim 14, wherein the chamfer is defined by a tapering of the thickness of the outer peripheral edge of the protective cover.

16. An instrument according to claim 2, in which light is arranged to escape from the protective cover to the exterior of the instrument at a selected location.

17. An instrument cluster comprising a plurality of instruments according to claim 2 arranged such that the information bearing surfaces of a first instrument is other than coplanar with the information bearing surface at a second instrument.

18. An instrument according to claim 2, wherein the material in white paint.

19. An instrument according to claim 2, wherein the information bearing surface faces the interior surface of the protective cover, and wherein the layer of material is positioned on the exterior surface of the protective cover.

20. An instrument according to claim 2, wherein the layer of material extends around the outer periphery of the protective cover.

21. An instrument according to claim 2, further comprising a bezel covering the exterior of the layer of material.

22. An instrument according to claim 2, further comprising a cladding layer positioned on the protective cover, the cladding layer having a refractive index less than the refractive index of the protective cover to prevent light from escaping the protective cover proximate the cladding layer.

* * * * *